(12) United States Patent
Shoup

(10) Patent No.: US 8,479,669 B2
(45) Date of Patent: Jul. 9, 2013

(54) DEPTH CONTROL ARRANGEMENTS FOR A ROTARY ROW CLEANER FOR A PLANTER

(76) Inventor: Kenneth E. Shoup, Kankakee, IL (US)

(*) Notice: Subject to any disclaimer, the term of this patent is extended or adjusted under 35 U.S.C. 154(b) by 206 days.

(21) Appl. No.: 12/800,851

(22) Filed: May 24, 2010

(65) Prior Publication Data
US 2011/0283927 A1 Nov. 24, 2011

(51) Int. Cl.
| | |
|---|---|
| A01B 33/12 | (2006.01) |
| A01B 39/08 | (2006.01) |
| A01B 39/18 | (2006.01) |
| A01B 49/04 | (2006.01) |
| A01B 63/24 | (2006.01) |
| A01B 5/00 | (2006.01) |
| A01B 21/04 | (2006.01) |
| A01B 7/00 | (2006.01) |
| A01B 15/16 | (2006.01) |
| A01B 15/18 | (2006.01) |
| A01B 21/08 | (2006.01) |

(52) U.S. Cl.
USPC ............. 111/139; 111/163; 111/63; 111/135; 111/194; 172/29; 172/624; 172/624.5; 172/627; 172/661

(58) Field of Classification Search
USPC ................... 111/139–144, 147, 149–169, 62, 111/85, 200, 52, 190–195, 59, 63, 134–137; 172/29, 30, 624.5, 604, 619, 624, 627, 661, 172/657
See application file for complete search history.

(56) References Cited

U.S. PATENT DOCUMENTS

| | | | | |
|---|---|---|---|---|
| 4,055,126 A | * | 10/1977 | Brown et al. | 111/148 |
| 6,135,037 A | * | 10/2000 | Juptner | 111/139 |
| 2009/0301367 A1 | * | 12/2009 | Martin | 111/139 |
| 2010/0000451 A1 | * | 1/2010 | Martin et al. | 111/141 |

* cited by examiner

*Primary Examiner* — Christopher J Novosad
(74) *Attorney, Agent, or Firm* — Olson & Cepuritis, Ltd.

(57) ABSTRACT

The invention pertains to apparatus for use with a row planter unit. The apparatus includes an elongated and laterally extending bar operatively secured to a row planter unit for pulling same in a forward direction of travel. The apparatus includes a frame carried by the elongated and laterally extending bar and a support arm pivotally mounted thereon. At least one rotatable trash wheel is carried on the support arm. The row planter unit is pivotally supported on the frame rearwardly of the trash wheel in the direction of travel. Articulated members operatively connect the support arm to the row planter unit for applying a pull force to the rear of the support arm for controlling the depth of penetration of the trash wheel into the ground. The articulated members may comprise various alternatives including a link chain, a pair of links pivoted to one another in an offset relationship, or a link and a turnbuckle arrangement.

16 Claims, 4 Drawing Sheets

DEPTH CONTROL ARRANGEMENTS FOR A ROTARY ROW CLEANER FOR A PLANTER

BACKGROUND OF THE INVENTION

The present invention pertains to agricultural apparatus and, more particularly, to depth control arrangements for rotary, ground driven trash row cleaners used with row planter units in conservation tillage farming, such as, no-till or low-till. An example of a previous agricultural apparatus that incorporates a row planter unit utilizing a rotary row cleaning mechanism is shown in Shoup U.S. Pat. No. 6,776,107, which is incorporated herein by reference.

The rotary row cleaning mechanism or row cleaner for clearing away trash in front of the planter unit operates independently of the planter unit. The row cleaner is carried on the rear of a support arm that is pivotally mounted intermediate its ends and is spring biased at the front so as to urge the row cleaner toward the ground to clear trash that may be on the ground in front of the planter unit. In use, the row cleaner may touch the ground or penetrate the ground further than intended, thus unnecessarily disturbing the ground, and the trash may not be moved away from the row planter unit opener as intended, thereby impeding operation of the planter unit.

SUMMARY OF THE INVENTION

An object of the present invention is to provide a depth control linkage connected between the support arm for the trash row cleaner and the row unit for applying a pull force to the rear end of the support arm for controlling the depth of penetration of the trash row unit into the ground.

Another object of the invention is to provide a depth control linkage connected between the support arm for the trash row cleaner and the row unit that is adjustable for applying a pull force to the rear end of the support arm for selectively controlling the effective length of the depth control linkage to selectively control the position of the trash wheels with respect to the ground.

Another object of the present invention is to provide an articulated coupling between the support arm of the trash row cleaner and the planter unit for controlling the position of the trash row cleaner with respect to the ground.

Still another object of the present invention is to provide an adjustable and articulated coupling between the support arm of the trash row cleaner and the planter unit for controlling the position of the trash row cleaner with respect to the ground.

A further object of the present invention is to provide a chain link coupling between the support arm of the trash row cleaner and the planter unit for controlling the depth of penetration of the trash row cleaner into the ground.

Yet another object of the present invention is to provide an articulated link arrangement between the pivoted support arm of the trash row cleaner and the planter unit for controlling the depth of penetration of the trash row cleaner into the ground.

Another object of the present invention is to provide an articulated link with an adjustable turnbuckle between the spring biased pivoted support arm of the trash row cleaner and the planter unit for controlling the depth of penetration of the trash row cleaner into the ground.

In summary, the present invention provides apparatus for use with a row planter unit which includes an elongated and laterally extending bar by which the row planter unit is pulled in a forward direction of travel. The apparatus comprises a frame carried by the elongated and laterally extending bar and having pivotally mounted thereon a trash row cleaner which includes a support arm and at least one rotatable trash wheel on the support arm. The row planter unit is pivotally mounted on the frame rearwardly of the trash row cleaner in the direction of travel of the apparatus. Depth control linkage is connected between the support arm and the row planter unit for applying a pull force to the rear of the support arm for controlling the depth of penetration of the trash wheel into the ground. The depth control linkage may comprise articulated links that are pivoted to one another or a rod and trunnion arrangement. The articulated links may include various adjustment arrangements for varying the effective length of the articulated links and hence varying the depth of penetration of the trash wheel into the ground. In the rod and trunnion arrangement, the rod may be secured to the support arm and the trunnion may be secured to the row planter unit. The rod is movable in the opening in the trunnion to permit upward movement of the trash wheel with respect to the row planter unit. A fastener in an end of the rod will engage the trunnion in operation, whereby the rod will be pulled upwardly, as will be the support arm to which it is attached, for controlling the depth of penetration of the trash wheel in the ground.

Other objects and advantages of the present invention will be made more apparent in the drawing and description which follow.

BRIEF DESCRIPTION OF THE DRAWING

The invention consists of certain novel features and a combination of parts hereinafter fully described, illustrated in the accompanying drawing, and particularly pointed out in the appended claims. It will be understood that various changes in the details may be made without departing from the spirit, or sacrificing any of the advantages of the present invention.

DETAILED DESCRIPTION OF THE DRAWING

Figure 1:
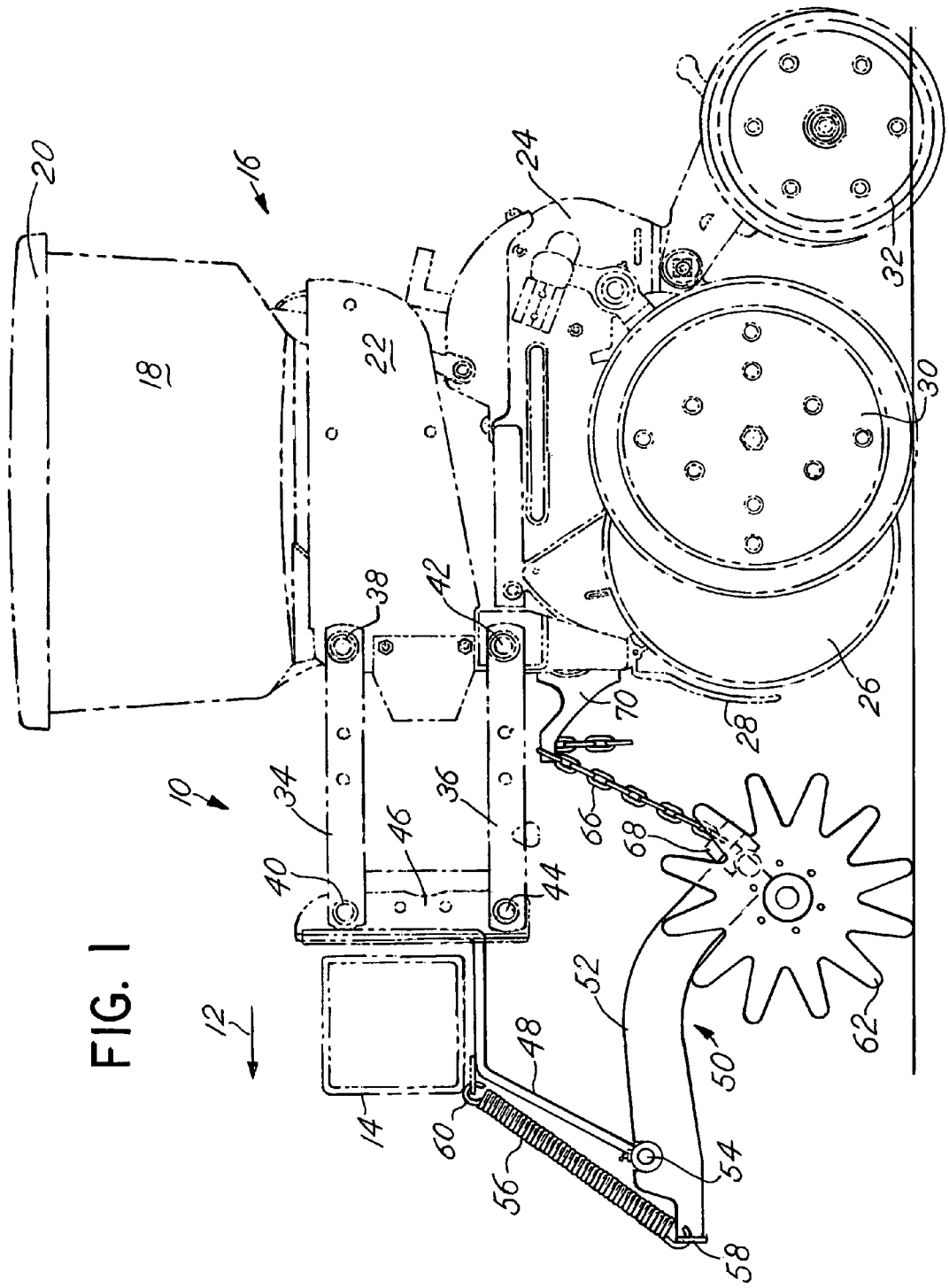
FIG. 1 is a side elevational view of a planter including a planter row unit having a trash cleaning mechanism positioned forward of the row planter unit and the adjustable chain mechanism of the present invention operatively connecting the row planter unit and the trash cleaning mechanism.

Referring to FIG. 1, there is shown a planter 10 that is adapted to be pulled in the direction of travel indicated by the arrow 12 by a suitable vehicle, for example, a tractor. The planter 10 includes an elongated and laterally extending draft tube 14 to which are mounted a plurality of laterally spaced apart row units, only one of which is shown in FIG. 1. Reference is made to Shoup U.S. Pat. No. 6,843,186 granted Jan. 18, 2005 as an example of a planter having a plurality of side by side row units connected to a draft tube. The spacing between the row units 16 depends upon the crop being planted. The row unit 16, which is representative of row units commonly used, includes a bin or hopper 18, which may contain seed, fertilizer, herbicide or the like, and a cover or lid for closing the bin 18. The bin 18 is carried on an upper frame 22, which is connected to a lower frame 24 to which is attached a traditional opener 26, scraper 28, gauge wheel 30, and closing mechanism 32, all as standard in the art. Each row unit 16 is connected to the draft tube 14 by means of parallel link arms 34, 36. It will be understood that there are two parallel link arms 34 and two parallel link arms 36. The upper link arms 34 are pivoted at one end as indicated at 38 to the upper frame 22 and at the other end, as indicated 40 to a mounting plate 46 that is affixed to the draft tube 14. The lower link arms 36 are pivoted at one end to the upper frame 22 as indicated at 42 and at the other end as indicated at 44 to the mounting plate 46.

Suitably affixed to and depending forwardly from the mounting plate 46 is a support member 48 for the trash cleaning mechanism 50. The trash cleaning mechanism 50 includes a support arm 52 that is pivoted intermediate its ends on the support member 48 as indicated at 54. A spring 56 is secured between a flange or projection 58 on the front end of the support arm 52 and a bracket on the support member 48. Carried on the free end of support arm 52 rearwardly of the pivot 54 are a pair of trash wheels 62, 64, which will be further discussed in connection with FIGS. 2 and 4. The spring 56 functions to bias the support arm 52 and the wheels 62, 64 carried thereon toward and into the ground.

A feature of the present invention is the depth control means for operatively connecting the trash cleaning mechanism 50 and the row unit 16 so as to control the depth of penetration of the trash cleaning mechanism into the ground. In a presently preferred embodiment shown in FIGS. 1-4, the connecting means includes a chain 66 connected at one end to a bracket 68 on the free end of the support arm 52 and connected at the other end to a mounting bracket 70 on the lower frame 24 of the row unit 16. Since the chain 66 is formed of links joined to one another, an articulated connection is formed whereby the trash cleaning wheels 62, 64 can move upwardly with respect to the row unit 16 to help clear trash that may accumulate in operation, however, the downward movement of the trash wheels 62, 64 is limited to the length of the chain 66 when it is taut, thereby limiting the penetration of the trash wheels 62, 64 into the ground during operation. In operation, pivoting of the row unit 16 upwardly relative to the draft tube 14 during movement of the row unit over a field, will exert a pull force on the support arm 52, thereby limiting undesirable penetration of the trash wheels 62, 64 into the ground.

Figure 2:
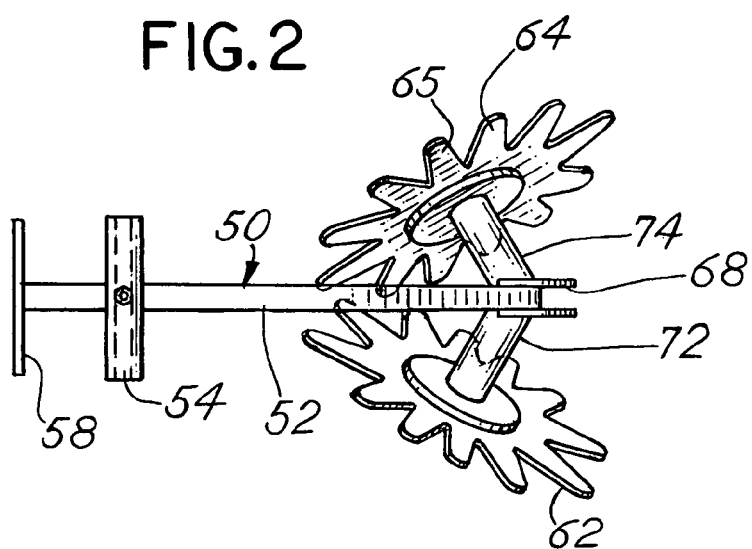
FIG. 2 is a top view of the trash cleaning mechanism.
Figure 3:
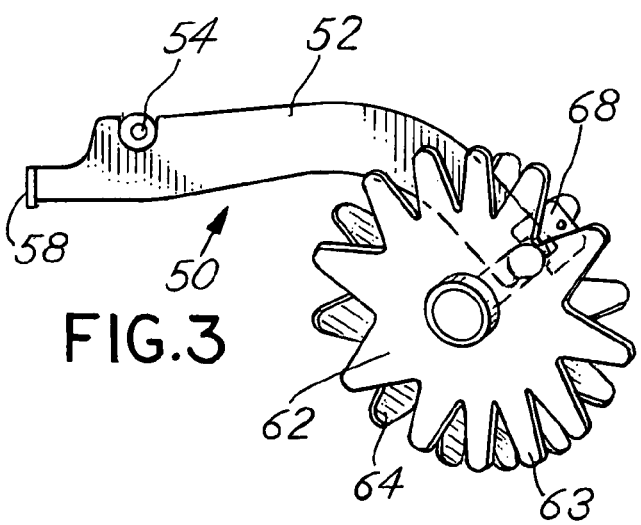
FIG. 3 is a side elevational view of the trash cleaning mechanism.
Figure 4:
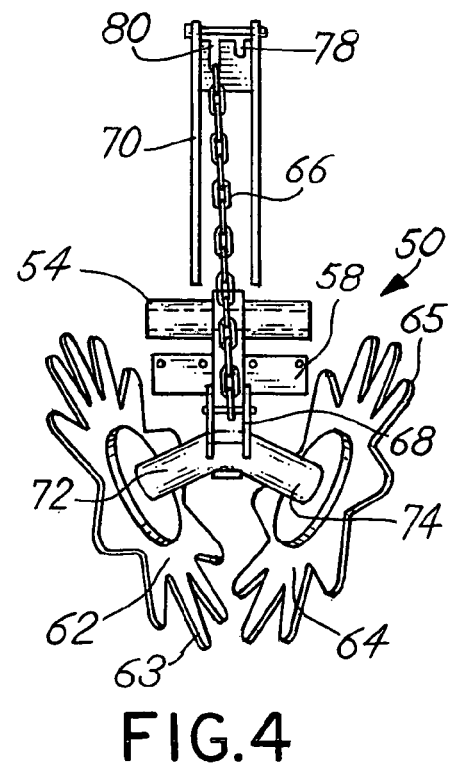
FIG. 4 is a rear view of the trash cleaning mechanism illustrating the connection of the adjustable chain between the trash cleaning mechanism and the support bracket on the row planter unit.

Turning to FIGS. 2-4 there is more clearly shown the trash cleaning mechanism 50 and mounting of the chain connection 66 between the rear of the support arm 52 of the trash cleaning mechanism 50 and the support bracket 70 on the lower frame 24 of the row unit 16. The support arm 52 has a flange 58 at the forward end with a hole therein for receiving an end of the spring 56 (FIG. 1). Intermediate its ends and closer to the bracket 58 than to the trash wheels 62, 64 is the pivot 54, for pivotally connecting the support arm 52 to the support member 48. The trash wheel 62, which has teeth 63 thereon, is rotatably carried on a stub shaft 72 that is secured to the free end of the support arm 52. The trash wheel 64, which has teeth 65 thereon, is rotatably carried on a stub shaft 74 that is secured to the free end of the support arm 52. The teeth 63, 65 on the trash wheels 62, 64 can take different forms as will be apparent to persons skilled in the art. The stub shafts 72, 74 each extend forwardly and downwardly from the support arm 52. The angle forward may be on the order of 60° to 90°. The angle downward may be on the order of 15° to 25°. More specifically, in a current field application, a forward angle of 60° and a downward angle of 15° have proven satisfactory.

The chain adjustment arrangement is best shown in FIG. 4. At its lower end the chain 66 is pivoted on pin 76 secured transversely in the bracket 68. The mounting bracket 70 is provided with adjustment means which comprise in this embodiment of the invention two adjustment slots of different length, for example, one slot 78 may extend one inch from the top of the mounting bracket 70 and the other slot 80 may extend one and one/half inch from the top of the mounting bracket 70. At its upper end the chain 66 may be secured in either slot 78 or slot 80. If the chain 66 is secured in slot 78, the chain 66 is effectively shorter than when the chain 66 is secured in the slot 80. When taut, the chain 66 will have a different effective length.

Figure 5:
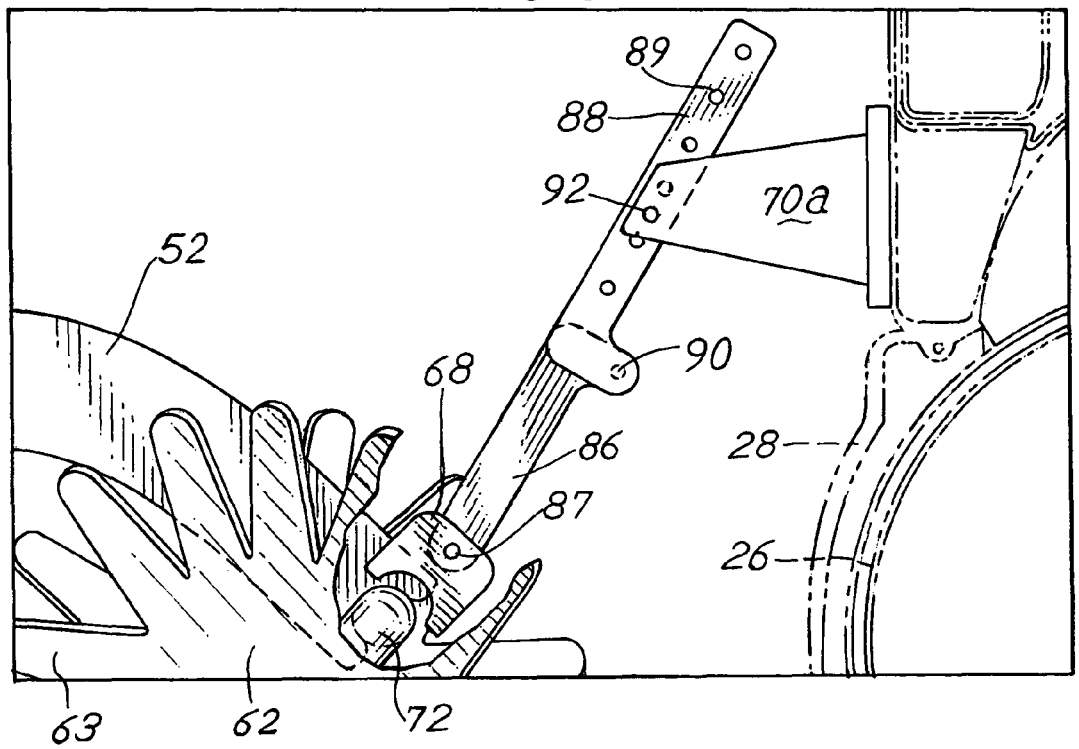
FIG. 5 is a side elevational view of an alternative connection between the trash cleaning mechanism and the support bracket on the row planter unit, said alternative connection including two links pivoted to one another by an off center pivot, with one link being adjustably connected to the support bracket.

With reference to FIG. 5, there is shown an alternative depth control connection between the trash cleaning mechanism and the row unit. The connection means of FIG. 5 includes a link 86 pivotally connected at its lower end through the hole 87 to the bracket 68 on the support arm 52 and a link 88 pivotally connected at 90 to the link 86 and pivotally connected to the mounting bracket 70a by a pivot pin 90. The pivot pin 90 extends through one of a plurality of holes 89 in the link 88 for adjustably connecting the link 88 to the mounting bracket 70a. It will be noted that the pivot is off center with respect to the links 86, 88, so as to permit the links 86, 88 to pivot with respect to one another and provide an articulated connection between the trash cleaning mechanism and the row unit during operation of the planter. By positioning the pivot pin 90 in a selected hole 89 in the link 88, the effective length of the depth linkage can be adjusted. Thus, during operation of the planter utilizing the depth linkage connection of FIG. 5, the trash cleaning mechanism can pivot about its pivot 54 and move upwardly with respect to the mounting bracket 70a on the row unit. The links 86, 88 would pivot abut pivot 90 to accommodate such movement. When the row unit 16 rises as it moves over the ground the links 86, 88 would be positioned as shown in FIG. 5 and the trash wheels of the trash cleaning mechanism would be pulled upwardly to control the depth of penetration of the trash wheels 62, 64 into the ground.

Figure 6:
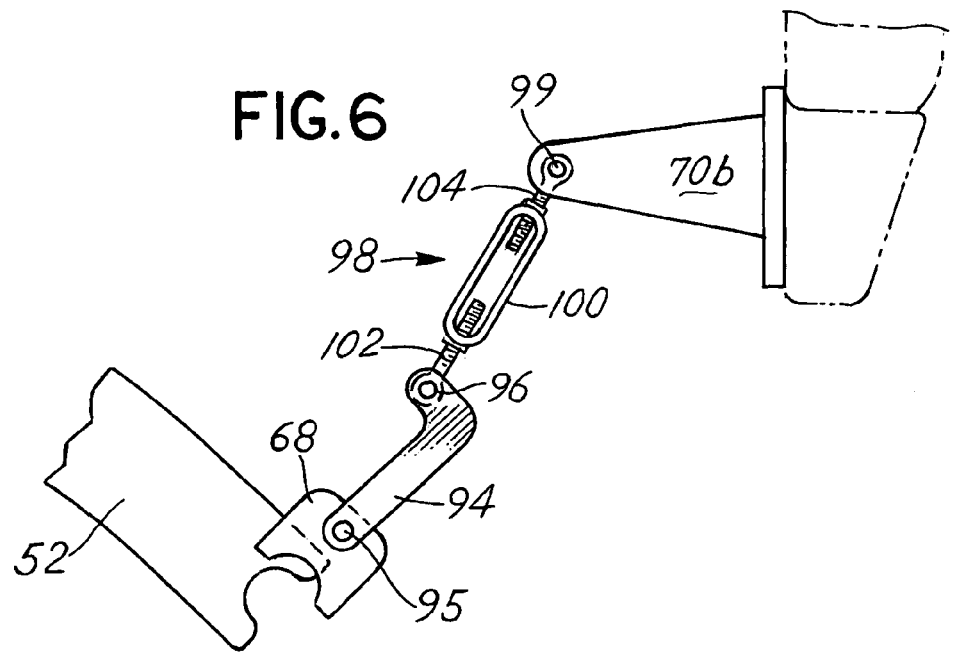
FIG. 6. is a side elevational view of another alternative connection between the trash cleaning mechanism and the support bracket on the row planter unit, said alternative connection including a link and a turnbuckle pivotally connected to one another so as to permit flexing of the connection and adjustment of the length of the connection.

Turning to FIG. 6 there is shown another embodiment of depth control connection. The link 94 has an opening 95 at its lower end for connecting the link 94 to the bracket 68 on the support arm 52. The upper end of the link 94 is pivotally connected at 96 to a turnbuckle link 98 that is operatively connected at its upper end at 99 to a mounting bracket 70b affixed to the lower frame of the row unit. The turnbuckle 98 comprises a sleeve 100 having threaded holes at each end adapted to receive eyelets 102 and 104. The eyelets 102, 104 have opposed threads to enable adjustment of the effective length of the turnbuckle 98, so as to adjust the effective length of the depth control linkage connecting the trash cleaning mechanism and the row unit. Thus, during operation of the planter utilizing the depth linkage connection of FIG. 6, the trash cleaning mechanism can pivot about its pivot 54 and move upwardly with respect to the mounting bracket 70b on the row unit. The links 94, 98 would pivot abut pivot 96 to accommodate such movement. When the row unit 16 rises as it moves over the ground the links 94, 98 would be positioned as shown in FIG. 6 and the trash cleaning mechanism would be pulled upwardly to control the depth of penetration of the trash wheels 62, 64 into the ground.

Figure 7:
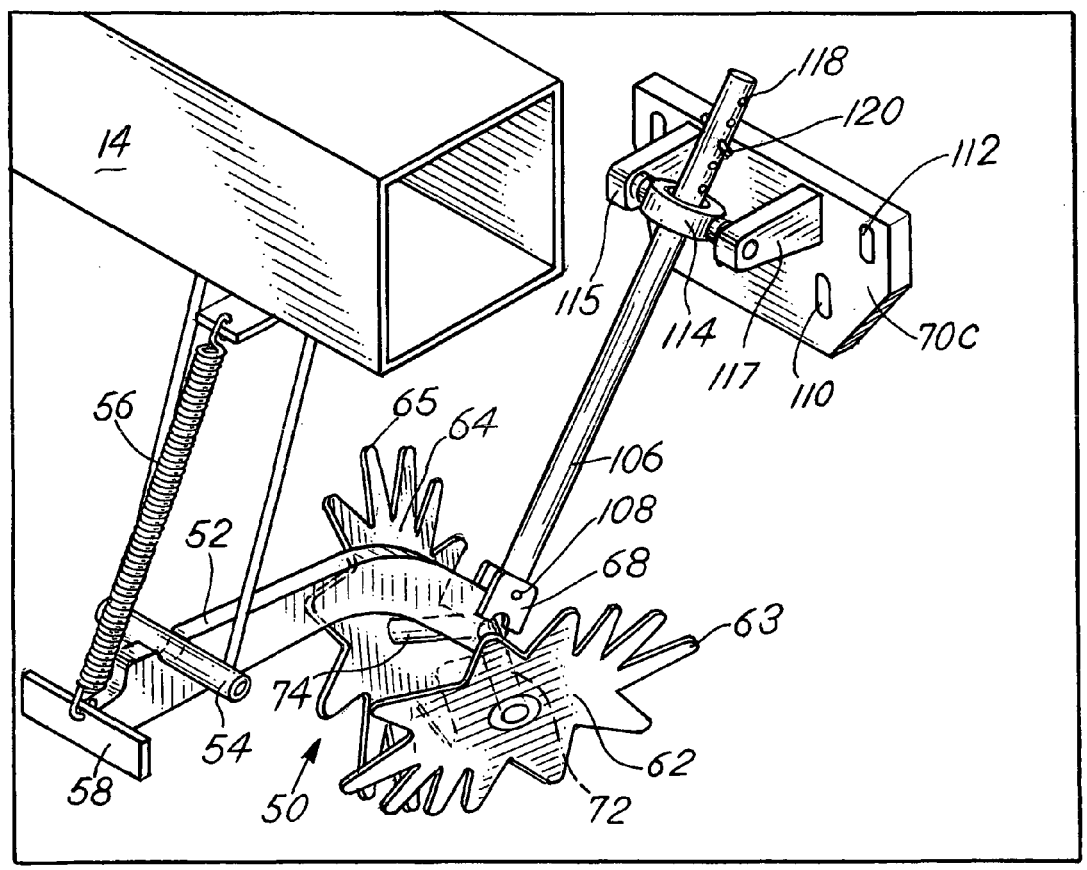
FIG. 7 is a side elevational view of a further alternative connection between the trash cleaning mechanism and the support bracket on the row planter unit, said alternative connection including a link operative in a trunnion, with adjustment holes in the link for adjusting the effective length of the link when the row planter unit is moving upwardly with respect to the trash cleaning mechanism during operation of the planter.

Turning to FIG. 7, there is shown yet another embodiment of depth control connection between the trash cleaning mechanism and the row unit. The link or rod 106 is pivotally connected at its lower end as indicated at 108 to a bracket 68a on the free end of the support arm 52. At its upper end the rod 106 passes through a trunnion 114 pivotally supported in arms 115, 117 that are secured to a mounting bracket 70c that is adapted to be connected to the lower frame of the row unit via slotted holes 110, 112. The trunnion 114 is pivoted on the arms 115, 117 that are secured to and extend forwardly from the mounting bracket 70c. The top of the rod 106 is provided with a plurality of longitudinally spaced through holes 118. A fastener 120, for example, a bolt or like longitudinal member, will extend through a selected hole 118 in the rod 106 for providing for adjustment of the effective length of the connection between the trash cleaning mechanism 50 and the row unit 16. During operation of the planter utilizing the depth linkage connection of FIG. 7, the trash cleaning mechanism 50 can pivot about its pivot 54 and the rear end of support arm 52 can move upwardly with respect to the mounting bracket 70c on the row unit. The rod 106 is slidably received in the trunnion 114 and can ride or move upwardly freely to accommodate such movement. When the row unit 16 rises as it moves over the ground the bolt 120 on the rod 106 would engage the top of the trunnion 114 and preclude further movement of the rod 106 downwardly with respect to the row unit and the trash cleaning mechanism 50 would be pulled upwardly or pivoted upwardly about its pivot 54 to control the depth of penetration of the trash wheels 62, 64 into the ground.

The present invention provides depth control linkage between the support arm of the trash cleaning mechanism and the row planter unit for applying a pull force to the rear of the support arm for controlling the depth of penetration of the trash wheels on the support arm into the ground. Though two trash wheels are shown on the support arm, it will be apparent to persons skilled in the art that a single trash wheel can be used or that the configuration of the trash wheel including the number and shape of the teeth can be adapted for a specific application. The depth control linkage can take various forms including articulated linkages and rod and trunnion arrangements. The effective length of the depth control linkages can be adjusted to adjust the depth of penetration of the trash wheel into the ground during operation.

While various embodiments have been shown and described, it will be apparent to persons skilled in the art that the invention may be otherwise embodied within the scope of the following claims.

I claim:

1. Apparatus for use with a row planter unit, said apparatus having an elongated and laterally extending bar by which a row planter unit is pulled in a forward direction of travel, said apparatus comprising a frame carried by the elongated and laterally extending bar and having pivotally mounted thereon a support arm and at least one rotatable trash wheel on the support arm, said row planter unit being pivotally supported on the frame rearwardly of the at least one rotatable trash wheel in the direction of travel, and articulated means for operatively connecting the support arm to the row planter unit and functioning in such manner that movement of the row planter unit away from the ground will control the depth of penetration of the at least one rotatable trash wheel into the ground.

2. Apparatus as in claim 1, wherein a pair of trash wheels are carried on the support arm.

3. Apparatus as in claim 1, wherein the support arm is pivoted on the frame intermediate ends of the support arm.

4. Apparatus as in claim 1, wherein a spring is provided between the support arm and the frame for biasing the support arm toward the ground.

5. Apparatus as in claim 4, wherein the spring is connected adjacent an end of the support arm forwardly of a support arm pivot connection to the frame.

6. Apparatus as in claim 1, wherein the articulated means is adjustable for varying the effective length of a connection between the at least one rotatable trash wheel and the row planter unit.

7. Apparatus as in claim 6, wherein the support arm has a free end, the at least one rotatable trash wheel being mounted on the free end, and a first end of a chain being connected to the free end of the support arm.

8. Apparatus as in claim 6, wherein the support arm is pivoted on the frame intermediate ends of the support arm, and the support arm has a free end disposed rearwardly of the pivot for the support arm, a first end of a chain being connected to the free end of the support arm.

9. Apparatus as in claim 6, wherein the articulated means comprises a chain that is connected at one end to the support arm and at a second end to the row planter unit.

10. Apparatus as in claim 9, wherein the row planter unit includes a mounting bracket and the second end of the chain is connected to the mounting bracket.

11. Apparatus as in claim 10, wherein the mounting bracket has at least two slots for receiving the chain, the slots being of different lengths for providing different effective lengths of the chain to adjust the depth that the trash wheel can enter the ground.

12. Apparatus as in claim 1, wherein the articulated means comprises a pair of elongated links pivoted to one another in off center relationship, one link being pivotally connected to the support arm and the other link being pivotally connected to a mounting bracket on the row planter unit.

13. Apparatus as in claim 12, wherein said other link has through holes therein spaced longitudinally from one another and a fastener passing through a selected through hole for adjustably connecting said other link to the mounting bracket.

14. Apparatus as in claim 1, wherein the articulated means comprises a link and a turnbuckle pivotally connected to one another, said link being pivotally connected at an end to the support arm, said turnbuckle being connected at an end to a mounting bracket on the row planter unit, said turnbuckle being adjustable to adjust the effective overall length of the articulated means so as to adjust the depth that the trash wheel can enter the ground during operation of the apparatus.

15. Apparatus as in claim 1, wherein the articulated means comprises a rod pivotally connected at one end to the support arm, a mounting bracket on the row planter unit, and a trunnion pivotally supported on the mounting bracket, said trunnion having an opening there through, said rod being movable in said opening in said trunnion for permitting movement of the trash wheel with respect to the row planter unit.

16. Apparatus as in claim 15, wherein the rod has a plurality of longitudinally spaced through holes therein, a fastener constructed and arranged to engage in a selected through hole between the end of the rod and the trunnion, whereby in operation, when the fastener engages the trunnion, the rod will be pulled upwardly, as will be the support arm to which it is attached, for controlling the depth of penetration of the trash wheel in the ground.

* * * * *